No. 663,088. Patented Dec. 4, 1900.
P. NAEF.
APPARATUS FOR MAKING CHLORIN.
(Application filed Apr. 24, 1900.)
(No Model.) 2 Sheets—Sheet 1.
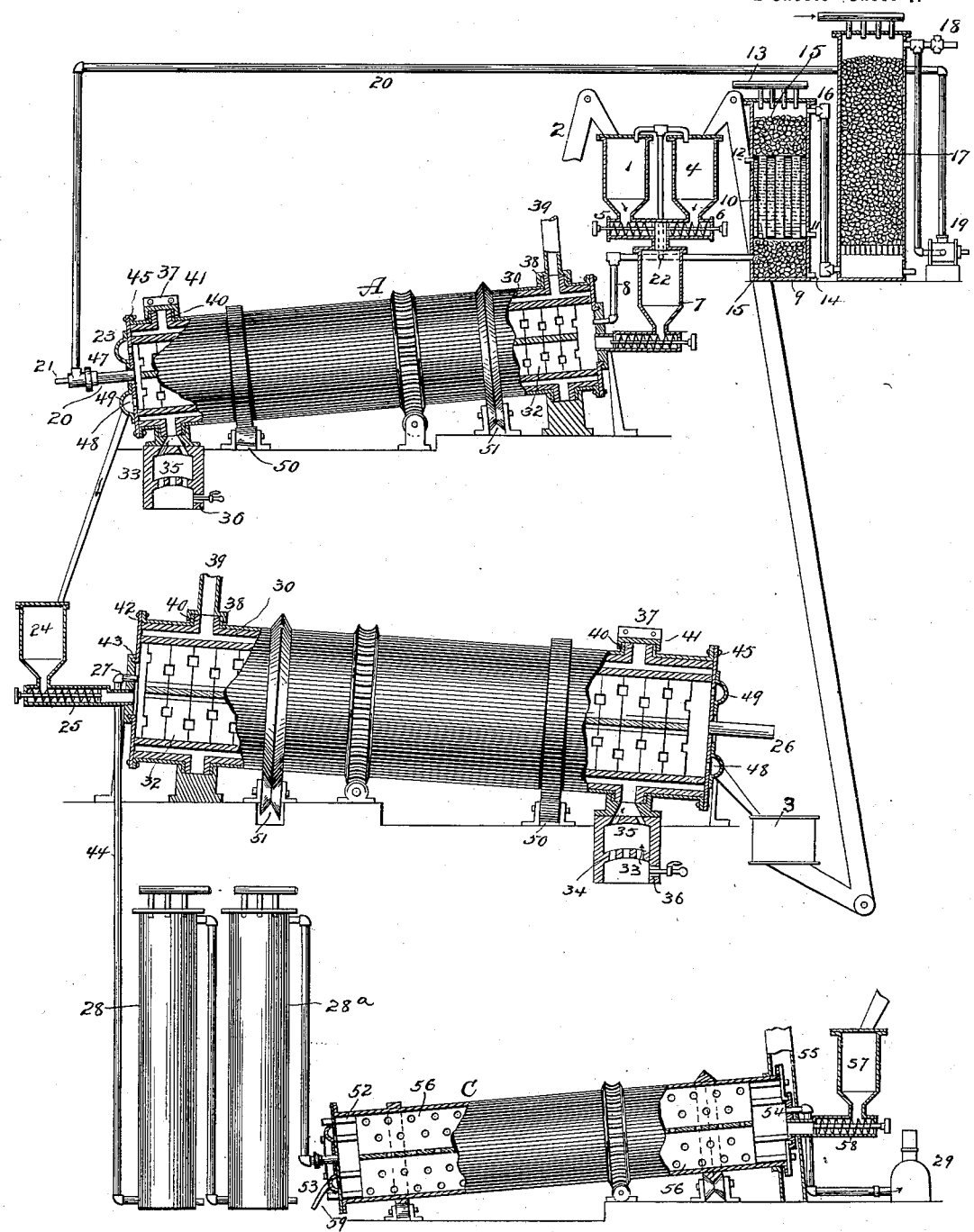
WITNESSES
INVENTOR
Paul Naef
By H. A. Seymour
Attorney No. 663,088. Patented Dec. 4, 1900.
P. NAEF.
APPARATUS FOR MAKING CHLORIN.
(Application filed Apr. 24, 1900.)
(No Model.) 2 Sheets—Sheet 2.
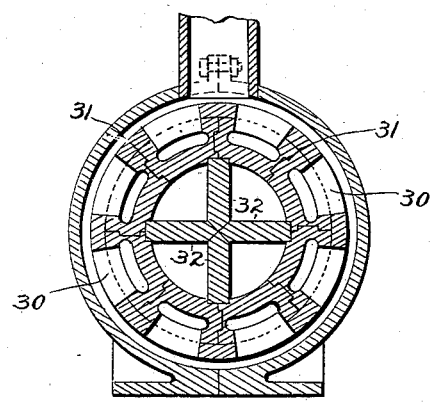
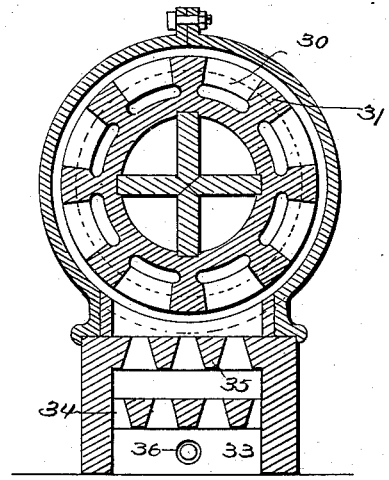
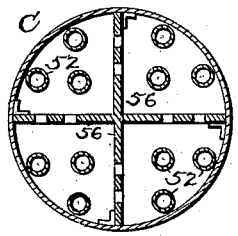
WITNESSES
INVENTOR
Paul Naef
By H. A. Seymour
Attorney

UNITED STATES PATENT OFFICE.

PAUL NAEF, OF NEW YORK, N. Y.

APPARATUS FOR MAKING CHLORIN.

SPECIFICATION forming part of Letters Patent No. 663,088, dated December 4, 1900.

Original application filed August 7, 1897, Serial No. 647,463. Divided and this application filed April 24, 1900. Serial No. 14,129. (No model.)

*To all whom it may concern:*

Be it known that I, PAUL NAEF, of No. 132 Woody Crest avenue, near One Hundred and Sixty-fifth street, New York, in the county of New York and State of New York, have invented certain new and useful Improvements in Apparatus for the Manufacture of Chlorin; and I do hereby declare the following to be a full, clear, and exact description of the invention, such as will enable others skilled in the art to which it appertains to make and use the same.

My invention relates to an improved apparatus for the manufacture of chlorin, the same being shown and described in my application for manufacture of chlorin, Serial No. 647,463, filed August 7, 1897, of which this application is a division, one object of the present invention being to provide means to effect the automatic and continuous production of chlorin from ammonium chlorid and magnesium oxid and to reduce the cost of the manufacture of chlorin to a minimum.

A further object is to provide an apparatus for the manufacture of chlorin which shall be comparatively simple in construction, which shall be automatic, continuous, and economical in operation, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view of my improved apparatus in position for use. Figs. 2 and 3 are sectional views of the furnace, and Fig. 4 is a sectional view of the absorber.

My improved apparatus may be used in combination with the ammonia-soda process. In the latter process brine saturated with ammonia is treated with carbonic-acid gas. Sodium bicarbonate is precipitated and ammonium chlorid and undecomposed salt are left in solution. From this solution pure solid ammonium chlorid is produced by freezing or evaporation, which forms the raw material for the process to be hereinafter described. A metallic oxid, preferably magnesium oxid, is mixed by mechanical means with ammonium chlorid. This mixture is passed continuously through a retort-furnace. At the same time carbonic or nitrogen gas is drawn from the discharge end to the feed end thereof. This gas, containing ammonia-vapors, is drawn from the furnace through condensers, and a slight vacuum will be maintained in the whole apparatus. The magnesium oxid, which has been partly converted into magnesium chlorid during the passage through the furnace, is continuously charged into another retort-furnace, preferably on a lower level than the first and preferably of larger size. Heated air is passed into the lower end of the lower furnace, and the oxygen of the atmosphere decomposes the magnesium chlorid, which is heated to dark-red heat in the furnace. Chlorin escapes from the higher end of the lower furnace, and magnesium oxid is discharged at the lower end of the furnace and is again utilized in carrying out the process. The reactions which take place in the upper furnace can be expressed thus:

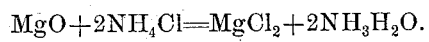

$$MgO + 2NH_4Cl = MgCl_2 + 2NH_3H_2O.$$

Ammonium chlorid is raised and deposited into a hopper 1 by means of an elevator 2, and magnesium oxid is elevated from a hopper 3 and deposited into a hopper 4, said hoppers 1 and 4 being preferably disposed side by side above the inlet or charging end of the upper furnace A. Screw conveyers 5 and 6 deliver the two materials—viz., ammonium chlorid and magnesium oxid—into a hopper 7. The speed of the conveyers is so regulated that hopper 7 contains a mixture of chlorid and oxid suitable for the process. A large excess of magnesium oxid over that required in the above equation is used chiefly for the purpose of preventing a sintering of the magnesium chlorid in the lower furnace and also for the purpose of reaching a complete elimination of ammonia in the upper furnace. The mixture of magnesium oxid and ammonium chlorid in hopper 7 is so regulated that the material which is discharged from furnace A contains one part of magnesium oxid to one to two parts of magnesium chlorid. The ammonia-gas escapes from the furnace A through a pipe 8 into a cooler 9, comprising a cylinder containing a number of tubes. The gas passes through the pipes or tubes 10 of the cooler, which are surrounded by cold water entering through a pipe 11 and having its exit at 12. The object of the cooler is to cool the gases and to remove any ammonium chlorid which may escape undecomposed. For this latter purpose warer is run into the top of the cooler through pipes 13 and allowed to run through the pipes or tubes 10 and wash out the ammonia and run off at 14. To insure a complete condensation of the chlorid-vapors, the spaces 15 above and below the pipes or tubes 10 are filled with porous material, such as coke or wood. The ammonia-gas leaves the cooler through a pipe 16 and enters a scrubber 17 or another washing apparatus for absorbing the ammonia. In the drawings I have shown a scrubber of ordinary construction, through which water or any other absorbing liquid is circulated. In order to assist the evolution and complete elimination of ammonia, a gas may be circulated through the furnace and the condensing apparatus which has no decomposing action on ammonia and magnesium chlorid. Such a gas may be obtained in the shape of waste gas in the ammonia-soda process and consists mostly of nitrogen and contains some carbonic oxid and carbonic acid. Instead of the waste gas above mentioned gas from a limekiln or any other gas containing carbonic acid can be used, in which case the ammonia is obtained as carbonate. The apparatus is usually worked in such a manner that always the same gas is circulating and only losses are made up by drawing gas from a gas-holder connected with scrubber 17 at 18. A pump 19 draws the gas from the scrubber 17 and delivers it to the upper furnace A through a pipe 20. A slight vacuum will be maintained in the whole apparatus. If the vacuum rises above one inch, (measured at the charging end of the furnace) gas will be drawn in at 18 from the gas-holder, preferably through a reducing-valve of any preferred form of construction. The presence of oxygen in the gas circulating through the apparatus must be strictly avoided, because it will destroy some of the ammonia. The gas acts mechanically in carrying off ammonia. For the purpose of hydrating some of the magnesia in the parts of the furnace where most of the ammonia is evolved steam is introduced through pipe 21, which terminates about centrally between the ends of the furnace. The steam is not introduced near the discharge end of the furnace, because it is desirable to prevent moisture being retained in the material. The reason for introducing steam between the ends of the furnace or container in which the ammonia is involved is to hydrate the magnesium in the cooler parts of the furnace, and thus facilitate the reaction, which can in this case be expressed:

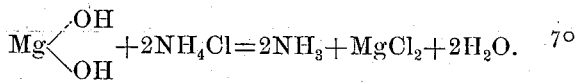

It may be here stated that ammonia can to a certain extent be eliminated without circulating gas or introducing steam; but the use of the latter is preferable both for preventing loss of ammonia and for facilitating reaction.

The hoppers 1, 4, and 7 are connected at 22 to the pipe 8, leading into the condensers, so as to draw off any ammonia-gas which may be evolved from these vessels. All the elevators and hoppers are preferably made of iron and are made air-tight.

The gas circulating through the apparatus can be heated in Cowper or other stoves before entering the furnace at 23, and thus all or part of the heat necessary for the reaction can be supplied in this way. If a sufficient volume of gas free from oxygen can be easily procured to supply all the heat, a furnace with a solid lining instead of with a lining constructed with heating-flues might be used.

The furnace A is the same in construction as the furnace B, which is used for the evolution of chlorin and a detailed discription of which will be hereinafter given; but the furnace A is smaller than furnace B.

Instead of arranging the furnace A above the furnace B both furnaces may be disposed on the same plane, if desired; but this would require an additional hopper and elevator to raise the material into hopper 24.

As stated when describing the action of furnace A, part or all the heat can be supplied also to furnace B by preheating the air in hot-air stoves. In such cases, and especially if an excess of air is not objectionable, such as in the manufacture of chlorate of potash, where the chlorin is absorbed by milk of lime, furnaces with solid lining can be used.

The material which is continuously discharged from furnace A consists of magnesium chlorid and oxid and runs continuously into hopper 24, from which it is continuously fed into furnace B by means of a conveyer 25. In the furnace B chlorin is evolved by the action of oxygen on the chlorid. The reactions in the lower furnace may be expressed as follows:

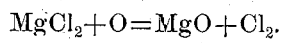

The magnesium oxid which is formed in the furnace B is continuously discharged from the furnace into hopper 3, from which it is elevated to hopper 1, as previously explained. Air enters the furnace B at 26, and chlorin-gas leaves it at 27. The chlorin-gas passes through two scrubbers 28 28ᵃ into a chlorin-absorber C, where it is absorbed by lime and is converted into bleaching-powder. With the absorber a suction fan or pump 29 is connected and serves to draw off the waste gases and creates a slight vacuum in the entire apparatus, as above intimated.

The scrubbers 28 28$^a$ are of the ordinary construction used in chlorin-works. In the first scrubber any hydrochloric acid is washed out by water, and in the second scrubber the chlorin-gas is dried by means of strong sulfuric acid. At the same time the gas is cooled (by radiation) during passage through pipes and scrubber.

Each furnace A and B is revolubly mounted and provided with flues 30 in the periphery, which flues may be conveniently formed by channeled tiles 31. Each furnace is provided with lifting partitions 32 for agitating or showering the material. Each furnace is also provided with a fire-chamber 33 at one end, said fire-chamber having perforated crowns 34 35, beneath which a gas-jet 36 is projected. Two flue-rings 37 38 are located on the periphery of the furnace, the one near the discharge end having communication with the fire-chamber and the one near the inlet or charge end of the furnace being in communication with the chimney 39. The annular flues 40 extend around the periphery and are preferably formed by two rings spaced apart and encircled by a ring 41, which rests on the pedestal, said ring 41 being also made in two parts secured together. By this arrangement ready access may be had to the annular flues, the latter being always in communication with the longitudinal flues 30. The fire-gases pass from the fire-chamber through the perforated crowns into the annular flues and thence through the longitudinal flues. The furnace carries at the charging end a plate 42, against which a stationary plate 43 is located, and through the latter the conveyers and the gas-pipe enter, said gas-pipe or furnace B being lettered 44 in the drawings. The plate 43 is made of as small diameter as possible, so as to reduce leakage to a minimum. The discharge end of the furnace is closed by a plate 45, to which is fastened the entrance-pipe 20 of furnace A and 26 of furnace B. The pipe 20 (furnace A) is connected by a turning joint 47 with the stationary main. The material is discharged from the respective furnaces through holes 48 in the plate 45. To prevent leakage of gas, a stationary hollow or chambered ring 49 is made to bear closely against the plate 45 and communicate with all the holes therein. The hollow rings 49 are connected by suitable pipes with the hoppers below them.

Each revoluble furnace A B is supported by rollers 50 and kept in position by means of V-shaped rollers 51. The furnaces may be slowly revolved by means of worm-gear or in any preferred manner.

The chlorin-absorber C hereinbefore referred to consists, preferably, of an iron cylinder mounted and revolved in the same manner as the furnaces A and B. The absorber is fitted with iron pipes 52, which run through the end plates 53 54, and these pipes act in two ways. They lift and shower the lime and they are also used for cooling to carry off the heat formed by the combination of lime and chlorin. For this purpose the pipes are open at both ends, so as to allow a free flow of air through them. The discharge end of the absorber is surrounded by a casing 55, which is in connection with a chimney to increase the draft. If necessary, water can be circulated through these pipes. The cylinder is also fitted with radial lifting partitions 56. The charging end of the absorber is the same as the furnaces A and B. Lime is continuously fed from a hopper 57 through conveyer 58 into the absorber and leaves it as bleaching-powder at 59.

My improved apparatus can be used for decomposing chlorid of magnesium obtained from other sources than by decomposing chlorid of ammonia. In this case the furnace A is unnecessary and the arrangement of furnace B is exactly as described, the only difference being that the hoppers 1 and 4 and mixing-conveyers 5 and 6 are placed above the hopper 24. The hopper 1 contains in that case magnesium chlorid instead of ammonium chlorid. The conveyers 5 and 6 will be so regulated that the hopper 24 contains a material of similar composition as when decomposing ammonium chlorid. The magnesium oxid produced in furnace B can then be used in other industries.

The hoppers 24 and 3 are used so that furnace B can be operated during short stoppages of furnace A, and vice versa.

Having fully described my invention, what I claim as new, and desire to secure by Letters Patent, is—

1. The combination with a furnace, of a hopper communicating therewith, two hoppers communicating with said first-mentioned hopper, a gas-outlet at one end of said furnace, a discharge-pipe communicating with the other end of said furnace, and means for injecting a gas into the outlet end of said furnace, substantially as set forth.

2. The combination with a furnace, of two hoppers for containing chlorid of ammonium and oxid of magnesium respectively, a third hopper adapted to receive said chemicals from the first-mentioned hoppers and discharge them into the furnace, a pipe for conducting ammonia from the furnace and pipes connected with said ammonia-pipe and communicating with the hoppers so as to receive ammonia from the latter, substantially as set forth.

3. The combination with a furnace and means for mixing chlorid of ammonium and oxid of magnesium and discharging the same into said furnace, of a pipe for conducting ammonia from the furnace, and a washer with which said pipe communicates, said washer comprising a cylinder, a series of pipes therein, absorbent material in the cylinder above and below said pipes and means for discharging water into the top of the cylinder, substantially as set forth.

4. The combination with a revoluble cylinder having a number of independent longitudinal peripheral flues or passages, an annular flue or passage encircling said cylinder and communicating with the longitudinal flues or passages, a furnace communicating with said annular flue or passage, another annular flue or passage encircling the other end of the cylinder and communicating with said independent longitudinal flues and a stack communicating with said last-mentioned annular flue or passage, substantially as set forth.

5. The combination with a revoluble cylinder having a number of independent longitudinal peripheral flues, a series of rings secured together and encircling one end of said cylinder and forming an annular flue communicating with the longitudinal flues, a furnace communicating with said annular flue, another series of rings secured together and encircling the other end of the cylinder and forming another annular flue communicating with said independent longitudinal flues and a stack communicating with said last-mentioned annular flue, substantially as set forth.

6. The combination with a revoluble furnace, of a ring secured to and partially closing one end thereof, so as to leave a small opening, a small fixed plate abutting against said ring supported independently of the furnace and coöperating with said ring to close the small opening in the end of the furnace and inlet and outlet devices communicating with the furnace through said small fixed plate, substantially as set forth.

7. The combination with a revoluble furnace, of two hoppers for containing chlorid of ammonium and oxid of magnesium respectively, a third hopper communicating with the first two and with the furnace, a pipe for discharging gas into the discharge end of the furnace, a pipe for conducting ammonia from the inlet end of the furnace, a second furnace, a hopper communicating therewith, means for conducting the mixture of chlorid and oxid of magnesium from the first furnace to said last-mentioned hopper, means for injecting air into said second furnace, a hopper communicating with said second furnace to receive oxid of magnesium therefrom, an elevator for conveying oxid of magnesium from said last-mentioned hopper to one of the first-mentioned hoppers, a chlorin-absorber and a pipe for conducting chlorin from said second furnace to said absorber, substantially as set forth.

8. The combination with a revoluble furnace and a pipe communicating with the discharge end thereof, of two hoppers for containing chlorid of ammonium and oxid of magnesium respectively, a third hopper, two conveyers for conducting the chemicals from the first-mentioned hoppers into the third hopper, and a conveyer for conducting the mixed chemicals from the third hopper to the furnace.

9. The combination with a cylinder mounted to revolve, of a stationary hollow ring closing against the end plate of the cylinder, said end plate having holes communicating with the interior of the cylinder and with the chamber in the stationary hollow ring and means for conducting material from the chamber of said hollow ring.

10. In an apparatus for making chlorin, the combination with a furnace, of a washer communicating therewith, said washer comprising a cylinder having layers of material therein for bringing gas and liquid into intimate contact, means for conducting gas from the furnace to said cylinder, means for discharging water into said cylinder, and cooling-pipes in the cylinder.

In testimony whereof I have signed this specification in the presence of two subscribing witnesses.

PAUL NAEF.

Witnesses:
C. E. LANGDON,
GERRIT SMITH.